Dec. 2, 1958     S. R. GRANCHE     2,862,583
EMERGENCY POWER BRAKE
Filed Jan. 6, 1954     2 Sheets-Sheet 1
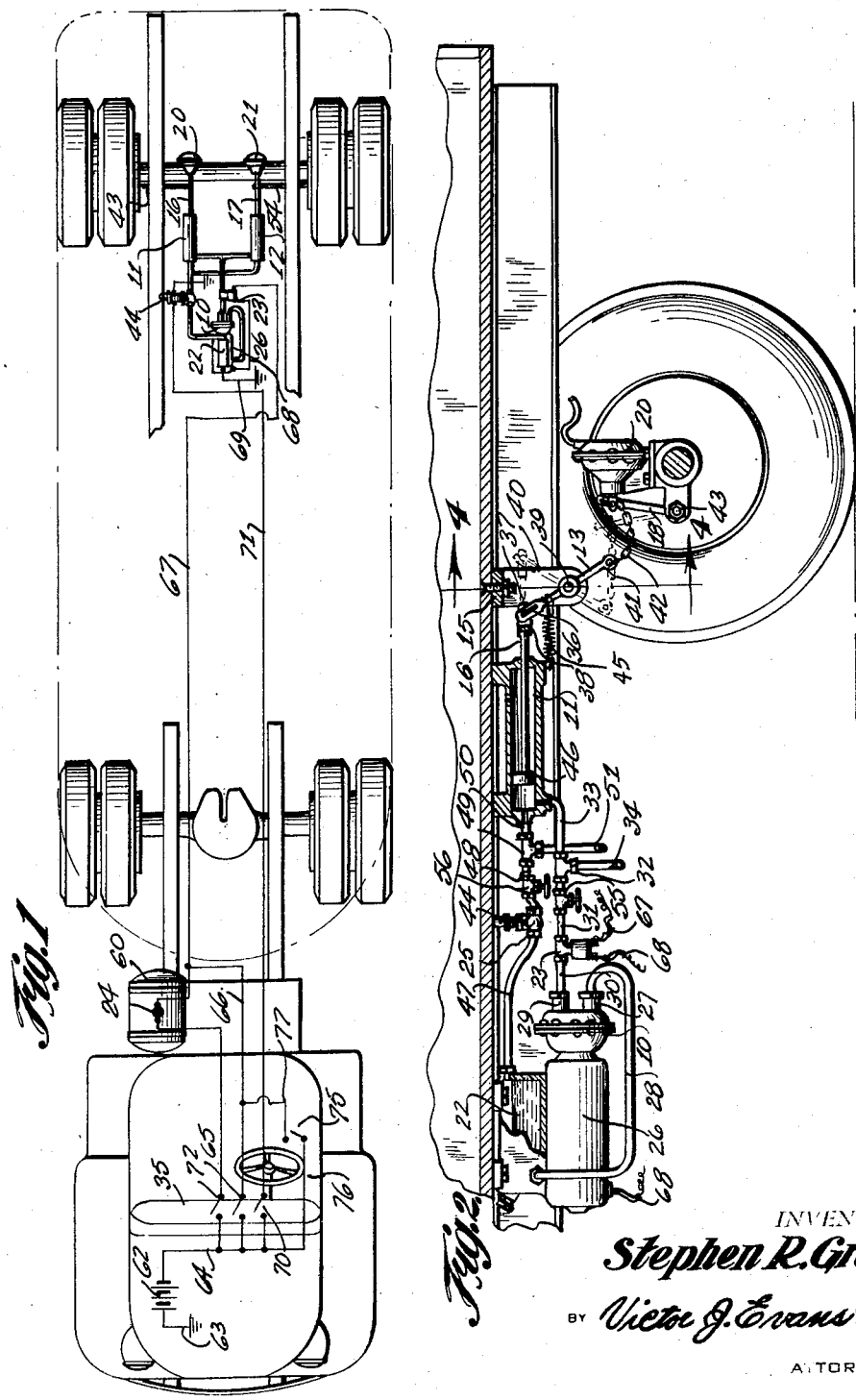
INVENTOR.
Stephen R. Granche
BY Victor J. Evans & Co.
ATTORNEYS

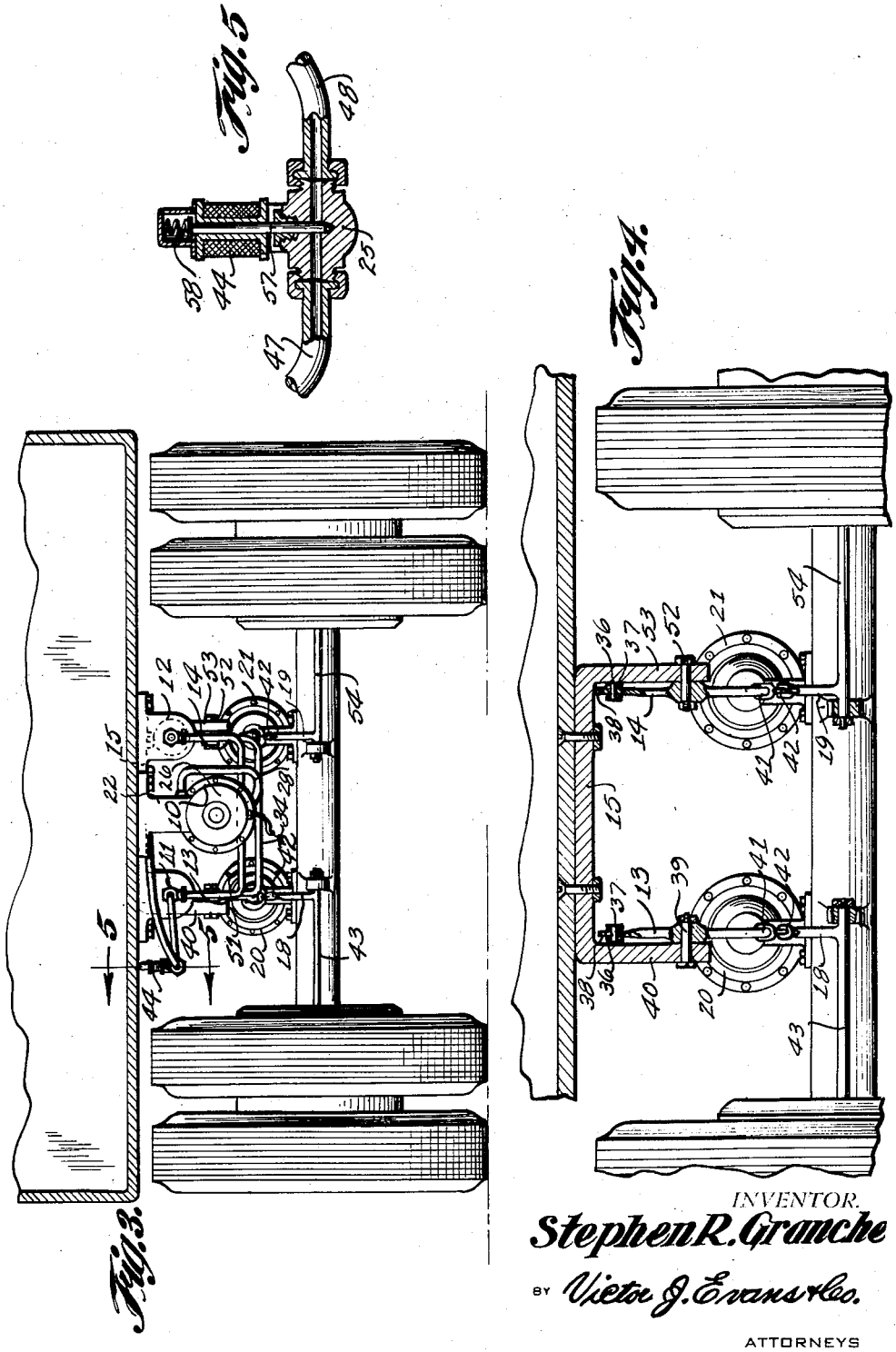

United States Patent Office 2,862,583
Patented Dec. 2, 1958

2,862,583

EMERGENCY POWER BRAKE

Stephen R. Granche, Pittsburgh, Pa.

Application January 6, 1954, Serial No. 402,554

2 Claims. (Cl. 188—106)

This invention relates to emergency brakes particularly adapted for use on trucks and trailers where the conventional brakes are not sufficient or fail, and in particularly a pair of hydraulic cylinders operatively connected to brakes of wheels of trucks or trailers with a motor driven pump for supplying fluid under pressure to the cylinders, a low pressure switch for completing a circuit to the motor of the pump when the pressure in the conventional brake system of the vehicle drops to a predetermined amount, a high pressure switch for breaking the circuit to the motor of the pump when the pressure between the pump and cylinders reaches a predetermined amount, a control valve for regulating the release and return of fluid from the cylinders, and control switches for operating the elements of the system adapted to be positioned in the cab or adjacent the operator's seat of the vehicle.

The invention also includes a dead man control mounted on or adjacent the steering wheel of a vehicle for applying the brakes should an operator fall asleep, or lose consciousness.

The purpose of this invention is to provide an auxiliary or emergency brake system that operates independent of the conventional brake system wherein an operator of a vehicle, in an emergency, may instantly apply brakes to supplement the conventional brakes of the vehicle.

Various types of attachments have been used in combination with brake systems of motor vehicles, however, where the brakes operate through the master cylinder or other conventional parts of the vehicle the emergency system is inoperative at the same time the conventional brakes of the vehicle fail. Various other types of devices have been provided for applying brakes independently however, such devices may only be used once or twice a year and without being tested periodically such devices fail to function when required.

With this thought in mind this invention contemplates a pivotally mounted lever loosely connected to the arm extended from each brake of a motor vehicle, such as by a chain or cable, independent hydraulic cylinders for actuating the levers, a pump in combination with a reservoir for supplying fluid under pressure to the cylinders and suitable control and storage means for operating the parts and providing fluid when required.

The object of this invention is, therefore, to provide an auxiliary brake system for motor vehicles and particularly trucks and trailers in which a hydraulic operating cylinder is provided for each brake of the vehicle and in which the cylinders are operated independently and also independent of the conventional brake system of the vehicle.

Another object of the invention is to provide an independent emergency power brake particularly adapted for trucks and trailers and that is adapted to be installed on vehicles now in use.

A further object of the invention is to provide an independently operating hydraulic brake system for motor vehicles in which the system is of a simple and economical construction.

With these and other objects and advantages in view the invention embodies hydraulic cylinders mounted on the under surface of the floor or chassis of a motor vehicle truck or trailer, levers pivotally mounted by hangers also on the frame or chassis and positioned with one end connected to a piston rod extended from each hydraulic cylinder and with their opposite ends connected by chains to brake actuating arms, a hydraulic pump for supplying fluid under pressure to the cylinders, a storage tank or reservoir, a solenoid actuated valve for controlling the return of the fluid from the cylinders to the reservoir, and a switch panel with suitable circuits extended therefrom to the operating parts of the system.

Other features and advantages of the invention will appear from the following description taken in connection with the drawings, wherein:

Figure 1 is a diagrammatic plan view showing the outline of the chassis of a trailer and cab combination looking downwardly upon the device and showing the hydraulic cylinders and pump assembly positioned adjacent the rear axle of the vehicle and connected to brake operating means of the wheels thereof.

Figure 2 is a longitudinal section through the rear portion of the trailer shown in Fig. 1 with the parts shown on an enlarged scale and illustrating the connections between the hydraulic cylinders, brakes and fluid supply pump.

Figure 3 is a cross section through the forward part of the truck or trailer body illustrating the relative positions of the hydraulic cylinders, fluid supply pump and brake controls.

Figure 4 is a cross section taken on line 4—4 of Fig. 2 showing a hanger on which levers for operating the brakes by the hydraulic cylinders are pivotally mounted, the parts being shown on an enlarged scale.

Figure 5 is a detail showing a section taken on line 5—5 of Fig. 3 illustrating a solenoid actuated valve in the return line of the fluid from the cylinders.

Referring now to the drawings wherein like reference characters denote corresponding parts, the improved emergency power brake of this invention includes a pump 10 for supplying fluid under pressure to cylinders 11 and 12, levers 13 and 14 pivotally mounted on ends of a hanger 15 and operatively connected to piston rods 16 and 17 extended from the cylinders, at one end, and to arms 18 and 19, respectively, of air brakes 20 and 21 of the vehicle upon which the system is installed, at the other, a storage reservoir 22, a high pressure switch 23 in the line connecting the pump to the cylinders, a low pressure actuated switch 24 positioned to be actuated by fluid of the conventional brake system of a vehicle upon which the device is used, a solenoid actuated valve 25 in the return line from the cylinders and a switch panel for controlling circuits to the solenoid actuated valve, pump and other parts of the system for operating the pump and brakes as required.

The pump 10 is positioned on the end of a motor 26 and the intake 27 of the pump is connected by a tube 28 to the supply reservoir 22.

The discharge of the pump, as indicated by the numeral 29, is connected by a tube 30 to the pressure switch 23 and from the switch 23 a tube 31 extends to a branch fitting or T 32 from which a tube 33 extends to the cylinder 11. A similar tube 34 extends from the T 32 to the cylinder 12 of the brake of the wheel on the opposite side of the vehicle.

The pressure switch 24 starts the system operating when the pressure in the system drops to a predetermined amount, and the high pressure switch 23 breaks the circuit to the motor of the pump when the pressure in the system reaches a predetermined amount.

The upper end of the lever 13 is provided with a slot 36 through which a pin 37 in a yoke 38 on the end of the piston rod 16 extends, and, as shown in Figs. 2 and 4, the lever 13 is pivotally mounted by a pin 39 in a downwardly extended end 40 of the hanger 15. An eye 41 on the lower end of the lever 13 is connected by a chain 42 to the conventional arm 18 which extends upwardly from the brake operating rod 43.

The fluid pressure in the cylinders 11 and 12 is released by completing a circuit with a button on the instrument panel, such as the panel 35, to a solenoid 44 of the valve 25 whereby the valve is opened, and a spring 45, one end of which is connected to the cylinder 11 and the other to the lever 13, actuates the lever which forces a piston 46 in the cylinder toward the opposite end of the cylinder with the piston returning to the position shown in Fig. 2. The spring may also be positioned in the cylinder or connected to the parts by suitable means.

The valve 25 is connected by a tube 47 to the storage reservoir 22 and by a tube 48 to a fitting 49 which is connected by a tube 50 to the cylinder 11. The fitting 49 is also provided with a branch connection 51 that extends to the end of the cylinder 12.

The lever 14 similar to the lever 13 and positioned on the opposite side of the vehicle, is mounted by a pin 52 on a downwardly extended end 53 of the hanger 15 and the upper end of the lever, which is also provided with a slot, is pivotally connected to the piston rod 17 of the cylinder 12, with the lower end connected to the arm 19 of the conventional brake rod 54.

The supply and return lines are provided with manually actuated valves with a valve 55 in the tube 31 of the supply line, for controlling the passage of fluid to the cylinders 11 and 12, and a valve 56 in the tube 48 whereby the area of the return passage may be controlled and this also provides means for manually actuating the control should the valve 25 fail. By this means both the supply and return connections may be controlled manually if desired.

The solenoid actuated valve 25 is preferably formed, as illustrated in Fig. 5 wherein a plunger 57 of the valve is urged downwardly by a spring 58 when the solenoid of the valve is deenergized, thereby closing the valve.

As illustrated in Fig. 1 the system utilizes the conventional air reservoir, as indicated by the numeral 60, in combination with which is a low pressure actuated switch 24, and current may be supplied to the valve from the battery of the vehicle as indicated by the numeral 62, with one end of the battery grounded as indicated by the numeral 63, and the other connected to a wire 64 of the panel 35. A switch or button 65 on the panel is connected by a by-pass wire 66 to a wire 67 which extends to the pressure switch 23, and the opposite side of the pressure switch is connected to the motor 26 with a wire 68. The opposite terminal of the motor is connected to a ground by a wire 69.

The switch 24 is operated by the pressure of the fluid in the reservoir 60. Therefore, no fluid lines go to the switch 24, only electric lines. This switch is similar to master cylinder brake switches that are operated by the pressure of fluid within the master cylinder.

Upon closing the switch 65 current is supplied directly to the motor 26 by-passing the pressure switch 23, whereby fluid under pressure is pumped to the hydraulic cylinders 11 and 12.

Should it be desired to release the brake a switch or button 70 on the panel 35 is closed whereby a circuit is completed from the battery through a wire 71 to the solenoid 44 of the valve 25 whereby the cylinders 11 and 12 are connected to the return and pressure on the cylinders is relieved.

The system is also provided with a dead man switch, as indicated by the numeral 75, which may be positioned adjacent the steering wheel, and this switch is connected by a wire 76 to the panel 35, and a wire 77 to the by-pass wire 66 whereby the motor of the pump is manually started.

The pressure switch 24 is actuated by the button or switch 72 whereby current may be supplied to the pressure switch with the switch 65 open.

With the parts arranged in this manner auxiliary fluid is provided under pressure for actuating hydraulic jacks or cylinders by which auxiliary brakes of a vehicle may be applied or by which the conventional brakes of the vehicle may be actuated, in case of failure of the conventional brake operating system of the vehicle.

The clearance between the rear axle or rear axle housing and chassis of different types of vehicles is different and for this reason the connections between the hydraulic cylinders and brake operating arms or levers will be modified to correspond with the vehicle upon which the brake system is installed.

Although the system is disclosed and described as a pressure system it will be understood that it may also be incorporated in a vacuum system.

It will be understood that modifications, within the scope of the appended claims, may be made in the design and arrangement of the parts without departing from the spirit of the invention.

What is claimed is:

1. In combination with a first fluid actuated brake system for vehicle wheels for operating a brake provided in each wheel; an auxiliary brake system comprising a hydraulic cylinder for each wheel, means for operatively connecting each of the cylinders to an actuating element of the brake of each wheel, a motor actuated pump for supplying fluid under pressure to the cylinders, a low pressure switch in the first fluid actuated brake system automatically starting the pump when the pressure of the fluid therein drops to a predetermined amount, a tube connecting the discharge of the pump to said cylinders, a high pressure actuated switch in said tube for stopping the pump when pressure between the pump and cylinders reaches a predetermined amount, a reservoir, a second tube connecting the cylinders to the reservoir, a solenoid actuated valve in the second tube for releasing fluid pressure of the cylinders, an operator control switch for actuating said solenoid actuated valve and an operator control switch for controlling said pump motor.

2. In the combined brake system as set forth in claim 1, including an additional operator control switch for starting the pump and applying the brakes should the operator become incapacitated.

References Cited in the file of this patent

UNITED STATES PATENTS

| 1,501,146 | Strother | July 15, 1924 |
| 1,711,565 | Hatfield et al. | May 7, 1929 |
| 2,128,916 | Cox | Sept. 6, 1938 |
| 2,192,021 | Weeks | Feb. 27, 1940 |
| 2,196,522 | Davis | Apr. 9, 1940 |
| 2,311,864 | Parsons | Feb. 23, 1943 |
| 2,457,467 | Hartman | Dec. 28, 1948 |
| 2,493,377 | Zeilman | Jan. 3, 1950 |
| 2,680,500 | Jenkins | June 8, 1954 |

FOREIGN PATENTS

| 531,465 | Great Britain | Jan. 6, 1941 |